(12) United States Patent
Hayakawa et al.

(10) Patent No.: US 7,855,857 B2
(45) Date of Patent: Dec. 21, 2010

(54) DISK DRIVE APPARATUS AND HEAD ASSEMBLY USED FOR THE SAME

(75) Inventors: Satoshi Hayakawa, Kanagawa (JP); Takeshi Chawanya, Kanagawa (JP); Masakazu Sasaki, Kanagawa (JP); Kenji Suzuki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 847 days.

(21) Appl. No.: 11/823,216

(22) Filed: Jun. 26, 2007

(65) Prior Publication Data

US 2008/0007862 A1   Jan. 10, 2008

(30) Foreign Application Priority Data

Jun. 29, 2006  (JP) .............................. 2006-178987

(51) Int. Cl.
    *G11B 21/02*  (2006.01)
(52) U.S. Cl. ..................................................... 360/266
(58) Field of Classification Search .................. 360/75, 360/244.2, 244.5, 265.9, 266, 97.02
    See application file for complete search history.

(56) References Cited

U.S. PATENT DOCUMENTS

| | | | | |
|---|---|---|---|---|
| 5,014,146 A | * | 5/1991 | Takatsuka et al. | 360/266 |
| 5,319,512 A | * | 6/1994 | Grapenthin | 360/265.9 |
| 5,657,187 A | * | 8/1997 | Hatch et al. | 360/244.8 |
| 5,875,076 A | * | 2/1999 | Hachiya et al. | 360/265 |
| 5,894,381 A | * | 4/1999 | Allen et al. | 360/244.9 |
| 5,953,180 A | * | 9/1999 | Frater et al. | 360/97.02 |
| 7,054,109 B2 | * | 5/2006 | Erpelding | 360/244.2 |
| 7,218,479 B2 | * | 5/2007 | Kuwajima et al. | 360/244.5 |
| 7,245,456 B2 | * | 7/2007 | Hashi et al. | 360/244.2 |
| 7,522,385 B2 | * | 4/2009 | Soga et al. | 360/266 |
| 7,636,222 B1 | * | 12/2009 | Dobosz et al. | 360/265.9 |

FOREIGN PATENT DOCUMENTS

JP    2004-272974    9/2004

* cited by examiner

*Primary Examiner*—Angel A. Castro
(74) *Attorney, Agent, or Firm*—Mahamedi Paradice Kreisman LLP; Christopher J. Brokaw (57) ABSTRACT

Embodiments of the present invention restrain the head position accuracy from degrading due to torsional vibration of a head supporting unit. According to an embodiment of the invention, an actuator has a twisted carriage arm. A suspension is tilted in accordance with the twist of the carriage arm. When the carriage arm and the suspension torsionally vibrate, the vibration direction tilts against the normal direction of a recording surface in accordance with the twist. This technique decreases a peak value of off-track displacement that is caused by a head slider and is dependent on relationship between a skew angle and a torsional vibration direction.

11 Claims, 9 Drawing Sheets

DISK DRIVE APPARATUS AND HEAD ASSEMBLY USED FOR THE SAME

CROSS-REFERENCE TO RELATED APPLICATION

The instant nonprovisional patent application claims priority to Japanese Patent Application No. 2006-178987 filed Jun. 29, 2006 and incorporated by reference in its entirety herein for all purposes.

BACKGROUND OF THE INVENTION

There are known disk drive apparatuses that use various types of media such as optical disks, magnetic optical disks, and flexible magnetic disks. Of those apparatuses, a hard disk drive (HDD) is widely used as a computer storage device and has become one of the mandatory storages for present computer systems. The HDD is used not only for computer systems, but also for moving picture recording and reproduction apparatuses, car navigation systems, and in digital cameras as removable memory. The use of the HDD is increasingly broadening because of its excellent characteristics.

The HDD includes: a magnetic disk for storing data; a head slider for reading or writing data on the magnetic disk; and an actuator for moving the head slider to a specified position over the magnetic disk. The actuator is driven by a voice coil motor. The actuator turns centering around a turning shaft to move the head slider in a radial direction over the rotating magnetic disk.

The head slider includes a slider and a head element formed on a slider surface. The head element includes: a recording element for converting an electric signal into a magnetic field according to data stored on the magnetic disk; and/or a read sensor for converting a magnetic field from the magnetic disk into an electric signal. The actuator includes: an elastic suspension; and a carriage arm for fixing the suspension. The head slider is fastened to the suspension. The head slider is supported by the actuator and floats over the rotating magnetic disk with a specified gap.

Vibration of the actuator degrades the accuracy for positioning the head slider. The actuator is vibrated by the vibration of the HDD itself or an air flow in the HDD due to the magnetic disk rotation. To solve this problem, there is proposed the technology of reducing the actuator vibration due to turbulence (e.g., see Japanese Patent Publication No. 272974/2004 ("patent document 1").

The actuator vibrations can be categorized into such modes as horizontal oscillation (sway), twist (torsion), and vertical oscillation (bending). The horizontal direction is parallel to a recording surface (principal plane) of the magnetic disk. The vertical direction is perpendicular to the recording surface of the magnetic disk. The sway mode moves the head so as to deviate from a track on the magnetic disk and therefore greatly affects positioning control. For solving this problem, an attempt is made to increase the horizontal rigidity or smoothen an air flow around the actuator.

The torsion mode signifies that the carriage arm twists. The carriage arm turns centering around its rigidity. Since the head element is positioned out of the rigidity center, the head position horizontally deviates according to the turn. For solving this problem, similarly to the sway mode, an attempt is also made to increase the rigidity or smoothen the air flow.

The bending mode signifies that the carriage arm bends toward its thin and weak portion. In the bending mode, the head element (head slider) moves and vibrates in a longitudinal direction of the actuator, i.e., in a direction regulated between the head slider and the turning shaft. Since the vibration direction (movement direction) is approximately parallel to a track, the bending mode has a smaller effect on the head position accuracy than the above-mentioned two vibration modes.

As a TPI (Tracks Per Inch) becomes high, there is an increasing demand for reducing not only the sway and torsion modes, but also the bending mode. Since the rigidity has been proven to be high, the sway or torsion mode can be accordingly improved by taking the above-mentioned countermeasures. Recently, however, the bending mode increasingly constitutes a significant fraction of degradation of the positioning accuracy.

An angle between the head element and the track varies with a position on the recording surface. The angle is generally defined by a skew angle. The skew angle is regulated by a line connecting the head element with the turning shaft center and a track's tangential direction. Typically, the skew angle is 0 near the center of the recording surface. An absolute value of the skew angle increases toward an inside periphery and an outside periphery. At the position where the skew angle is 0, the skew angle direction (skew angle's positive or negative) reverses depending on the inside periphery side and the outside periphery side.

When the head element shakes back and forth, the skew angle generates a vibrational component in an off-track direction, i.e., in the radial direction. Corrective measures need to be taken also for the bending mode in order to achieve the presently requested high TPI. However, the HDD imposes severe constraints in the height direction (normal direction against the recording surface). It is difficult to enhance the rigidity against the bending mode by increasing the thickness of the carriage arm. Increasing the thickness of the carriage arm also increases the volume thereof and greatly affects the actuator's balance or dynamics.

BRIEF SUMMARY OF THE INVENTION

Embodiments in accordance with the present invention restrain the head position accuracy from degrading due to torsional vibration of a head supporting unit. According to the particular embodiments of the present invention shown in FIGS. 1 and 2, an actuator 106 has a twisted carriage arm 111a. A suspension 110a is tilted in accordance with the twist of the carriage arm 111a. When the carriage arm 111a and the suspension 110a torsionally vibrate, the vibration direction tilts against the normal direction of a recording surface in accordance with the twist. This technique decreases a peak value of off-track displacement that is caused by a head slider 105 and is dependent on relationship between a skew angle and a torsional vibration direction.

BRIEF DESCRIPTION OF THE DRAWINGS

FIGS. 6(*a*) and 6(*b*) schematically show vibration and displacement of the head slider due to torsional vibration of an actuator arm including the carriage arm and the suspension according to one embodiment;

DETAILED DESCRIPTION OF THE INVENTION

Embodiments in accordance with the present invention relate to a disk drive apparatus and a head assembly used for it. More specifically, embodiments of the invention relate to a technology of correcting head misalignment due to torsional vibration of a head supporting unit for supporting a head.

A disk drive apparatus according to an embodiment of the invention includes: a motor that rotates a disk for storing data; a head that accesses a rotating disk; and a head supporting unit that supports the head and moves the head above a recording surface of the disk. The head supporting unit has a torsional vibration mode and torsionally vibrates at least at part of positions above the recording surface in a tilting direction along a radial direction of the disk against a normal line for the recording surface so as to reduce a vibrational component of the head along a radial direction of the disk at least. Since the head supporting unit torsionally vibrates in this manner, the head positioning accuracy can be improved.

According to an example, the head supporting unit torsionally vibrates at least at part of positions in a region outside a middle of the recording surface in a tilting direction along a radial direction of the disk against a normal line for the recording surface so as to reduce a vibrational component of the head along a radial direction of the disk. It is possible to effectively restrain the head positioning accuracy from degrading at an outside periphery that causes a large vibration.

The head supporting unit turns around a turning shaft. A skew angle may vary toward an outermost track from an innermost track on the recording surface. In such case, a torsional direction apart from the recording surface preferably tilts toward an outside periphery from the normal line. A torsional direction close to the recording surface preferably tilts toward an inside periphery from the normal line. It is possible to effectively restrain the head positioning accuracy from degrading at an outside periphery that causes a large vibration.

The head supporting unit may turn around a turning shaft and twists toward the head from the turning shaft. This makes it possible to adjust a torsional direction by means of a simple process.

A skew angle may vary toward an outermost track from an innermost track on the recording surface. In such case, the head supporting unit preferably twists so as to tilt toward an outside periphery. It is possible to effectively restrain the head positioning accuracy from degrading at an outside periphery that causes a large vibration. The head supporting unit may include: a suspension for supporting the head; and a carriage arm that connects the suspension with the turning shaft and twists along a direction from the turning shaft to the head.

An angle of the torsional direction against the normal line may range between 0.05° and 0.51°. This makes it possible to effectively improve the head positioning accuracy.

A disk drive apparatus according to another embodiment of the invention includes: a head that accesses a rotating disk; and a head supporting unit that supports the head, turns around a turning shaft, and moves the head above a recording surface of the disk. The head supporting unit twists along a direction from the turning shaft to the head and torsionally vibrates in a tilting direction along a radial direction of the disk against a normal line for the recording surface.

A skew angle may vary toward an outermost track from an innermost track on the recording surface. In such case, the head supporting unit may include: a suspension for supporting the head; and a carriage arm that connects the suspension with the turning shaft and twists along a direction from the turning shaft to the head so that the carriage arm tilts toward an outside periphery.

A head assembly according to another embodiment of the invention includes: a head that accesses a disk for storing data; and a head supporting unit that supports the head, turns around a turning shaft, and moves the head above a recording surface of the disk. The head supporting unit has a torsional vibration mode and torsionally vibrates at least at part of positions above the recording surface in a tilting direction along a radial direction of the disk against a turning shaft direction for the recording surface so as to reduce a vibrational component of the head along a radial direction of the disk at least. Since the head supporting unit torsionally vibrates in this manner, the head positioning accuracy can be improved.

Embodiments of the present invention can restrain the head position accuracy from degrading due to torsional vibration of a head supporting unit.

The following describes applicable embodiments of the invention. For clarification of the explanation, the following descriptions and drawings are omitted and simplified as needed. The same parts or components are depicted by the same reference numerals in the drawings. For clarification of the explanation, a duplicate description of the elements is omitted as needed. Preferred embodiments of the invention will be described below using a hard disk drive (HDD) as an example of the disk drive apparatus.

Figure 1:
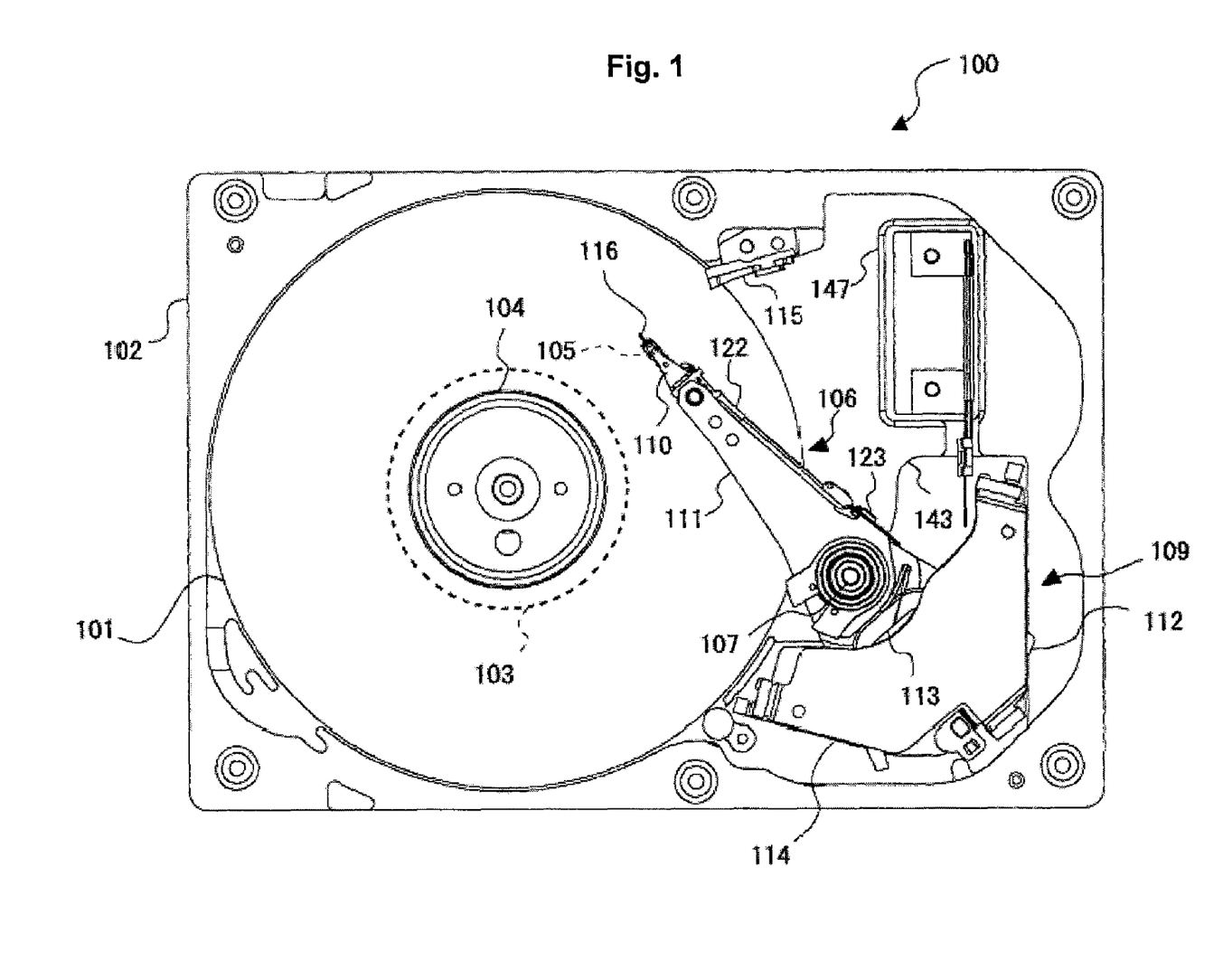
FIG. 1 is a top view schematically showing an overall construction of a hard disk according to an embodiment of the present invention.

An actuator according to an embodiment is provided with torsional vibration mode. The HDD according to the embodiment tilts the torsional vibration direction in the radial direction of the magnetic disk against the normal line for the recording surface. This can improve the head position accuracy in the off-track direction. With reference to FIG. 1, the following describes an overall construction of the HDD according to an embodiment of the invention.

FIG. 1 is a top view schematically showing the overall construction of an HDD 100 according to the embodiment. FIG. 1 shows a state of the HDD 100 when an actuator is positioned to be active. A magnetic disk 101 is an example of disks for storing data and is nonvolatile. A magnetic layer is magnetized to record data. A base 102 is fastened to a cover (not shown) for closing a top opening of the base 102 via a gasket (not shown). In this manner, a disk enclosure as an example of packages is constructed and can contain constituent elements of the HDD 100.

A clamp 104 fastens the magnetic disk 101 to a spindle motor 103. The magnetic disk 101 is rotatively driven at a specified angular rate (speed) by the spindle motor 103 fastened to the bottom of the base 102. A head slider 105, as an example of heads, accesses the magnetic disk 101. The head slider 105 includes a head element and a slider to which the head element is fastened. The head element includes a read element and a write element. The read element reads magnetic data from the recording surface of the magnetic disk 11 by converting the data into an electric signal. The write element generates a magnetic field using an electric signal and writes magnetic data on the recording surface. The actuator 106 holds and moves the head slider 105. The actuator 106 is rotatably supported by a turning shaft 107 and includes a voice coil motor (VCM) 109 as a drive mechanism for turning itself.

The actuator 106 is provided with the head slider 105 at its tip. The actuator 106 includes constituent members connected in the order of a suspension 110, a carriage arm 111, and a coil support 112 from the tip. The head slider 105 is fastened to a surface of the suspension 110 corresponding to the recording surface. This specification uses a term of head gimbal assembly (HGA) to signify an assembly of the suspension 110 and the head slider 105.

The coil support 112 supports a flat coil 113. The flat coil 113 is sandwiched between an upper stator magnet retaining plate 114 and a lower stator magnet retaining plate (not shown). A ramp 115 is positioned close to the outer edge of the magnetic disk 101. When the magnetic disk 101 stops rotating, the ramp 115 provides a parking position for unloading the head slider 105 from above the surface of the magnetic disk 101. A tab 116 is formed at the tip of the suspension 110 and slides on the ramp 115 during a load/unload operation.

When data is read from or written to the magnetic disk 101, the actuator 106 moves the head slider 105 above a data area in the recording surface of the rotating magnetic disk 101. Turning the actuator 106 moves the head slider 105 along the radial direction of the recording surface of the magnetic disk 101. When a force is generated over an ABS (Air Bearing Surface) of the slider opposite the magnetic disk 101 and balances with a pressing force of the suspension 110, the head slider 105 floats over the magnetic disk 101 with a specified gap.

A trace 122 is fixed to the actuator 106 and transmits a signal from the head slider 105. One end of the trace 122 is connected to the head slider 105 and the other end thereof is connected to an FPC 143 that includes a preamplifier IC 123. The trace 122 transmits a signal between the head slider 105 and the preamplifier IC 123. The FPC 143 is connected to a control circuit substrate (not shown) mounted on the rear of the bale 102 via a connector 147 according to circuit connections. The FPC 143 transmits a signal between the control circuit and the preamplifier IC 123. The control circuit on a control circuit substrate controls operations of the HDD 100 and processes signals thereof.

Figure 2:
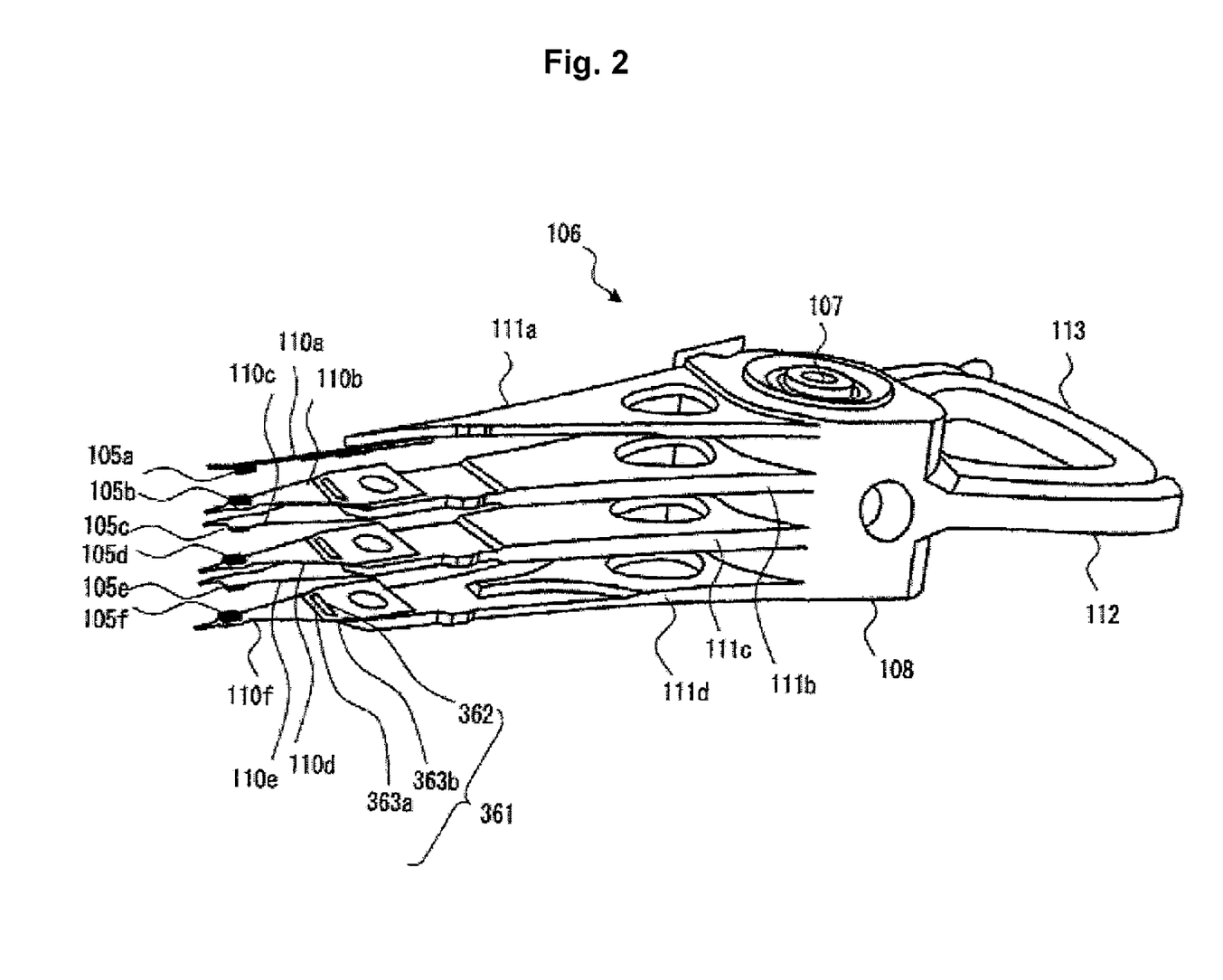
FIG. 2 is a perspective view schematically showing an example of a head assembly having an actuator and a head slider according to one embodiment.

FIG. 2 is a perspective view schematically showing an example of the head assembly according to the embodiment. The head assembly is provided with the actuator 106 and the head slider 105. The head assembly in this example includes four carriage arms 111a through 111d and six HGAs. The head assembly includes six suspensions 110a through 110f and head sliders 105a through 105f fixed to the suspensions 110a through 110f. That is, an HDD 1 is provided with three magnetic disks between the carriage arms 111a through 111d. The following description uses the notation of the head slider 105 without an alphabetical suffix when any one of the head sliders is described or the head slider is described comprehensively. The same applies to the suspension and the carriage arm.

The carriage arms 111a through 111d extend in a longitudinal direction between the suspensions 110a through 110f and the turning shaft 107 and connect them with each other. In this example, the carriage arms 111a through 111d are formed continuously with a turning shaft receptacle 108 for holding the turning shaft 107 and are connected to the suspensions 110a through 110f by means of caulking. Alternatively, the other known structures may be used.

Each of the suspensions 110a through 110f has a hinge 361. In FIG. 2, the reference numeral is assigned only to the suspension 110f for ease of explanation. The hinge 361 has a hole 362 to weaken its rigidity. Rod-like metal layers 363a and 363b are provided at both sides of the hole 362 along the turning direction and function as springs for generating a negative pressure against a buoyancy applied to the head slider 105 from an airflow caused by the rotation of the magnetic disk 101.

A characteristic point in FIG. 2 is that the carriage arm 111a is twisted. FIG. 2 assumes a near side to be an inside periphery of the magnetic disk 11 and a far side to be an outside periphery thereof. The carriage arm 111a is twisted so as to tilt toward the outside periphery centering around the longitudinal direction, i.e., the direction from the turning shaft 107 to the head slider 105. A twist angle gradually increases from the turning shaft 107 to the head slider 105a at the tip. The suspension 110a tilts toward the outside periphery according to the twist of the carriage arm 111a.

Figure 3:
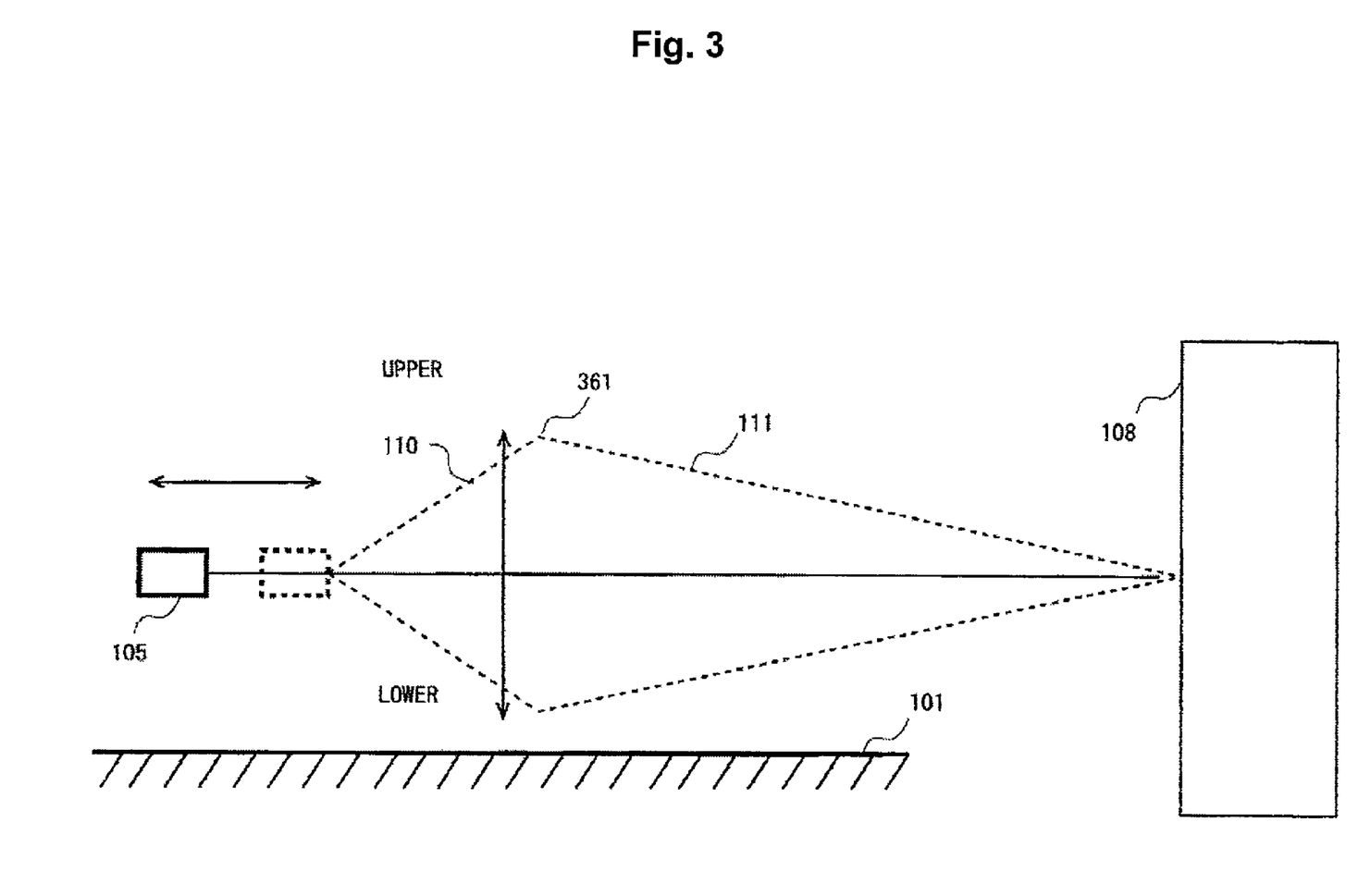
FIG. 3 schematically shows torsional vibration of a carriage arm and a suspension according to one embodiment.

Referring now to FIG. 3, the following describes a torsional vibration of the actuator 106 and a vibration of the head slider 105 according to the torsional vibration. The carriage arm 111 is structured to be thinner in a turning shaft direction (vertical direction of the HDD 1) than in the longitudinal direction approximately perpendicular to a width in the turning direction and to the turning direction on a surface parallel to the recording surface. The carriage arm 111 has a bending mode that causes a bend toward the thin direction. This vibration is coupled to a vibration mode in which the suspension 105 bends at the hinge 361 to vibrate. A co-assembly of the carriage arm 111 and the suspension 110 exemplifies the head supporting unit for supporting the head and generates a torsional vibration due to the coupling.

FIG. 3 shows a primary vibration in torsional vibration mode according to the coupling. The primary vibration of the torsional vibration causes a large vibration and accordingly generates a large displacement of the head slider 105. This primary vibration will be described below as the torsional vibration. The torsional vibration includes a node at the root of the carriage arm 111a, i.e., at a junction with the turning shaft receptacle 108. The torsional vibration generates a maximum amplitude at or near the hinge 361 positioned near the tip of the carriage arm 111 with reference to the recording surface of the magnetic disk 101.

The torsional vibration causes lengths of the carriage arm 111 and the suspension 110 to be constant in the longitudinal direction. The head slider 105 vibrates back and forth in the longitudinal direction of the carriage arm 111, i.e., in a direction regulated between the head slider 105 and the turning shaft 107 (or the turning shaft receptacle 108). A positive pressure and a negative pressure act between the head slider 105 floating through the ABS and the recording surface of the magnetic disk 101.

The head slider 105 keeps its floating height and tilt constant so as to be restrained by the recording surface. The head slider 105 vibrates parallel to the recording surface without vibrating in the normal direction of the recording surface. The maximum amplitude of the torsional vibration allows the head slider 105 to move closest to the turning shaft 107. The minimum amplitude 0 thereof allows the head slider 105 to move farthest from the turning shaft 107.

A skew angle is present between the head slider 105 (head element) and a track on the recording surface in the tangential direction and varies with a radial position on the recording surface. The presence of the skew angle varies a vibration direction of the head slider 105 against the track's tangential direction depending on a radial position on the recording surface. That is, the radial position varies the magnitude of a radial-direction component (off-track component) in the vibration of the head slider 105. This will be explained with reference to FIG. 4.

Figure 4A:
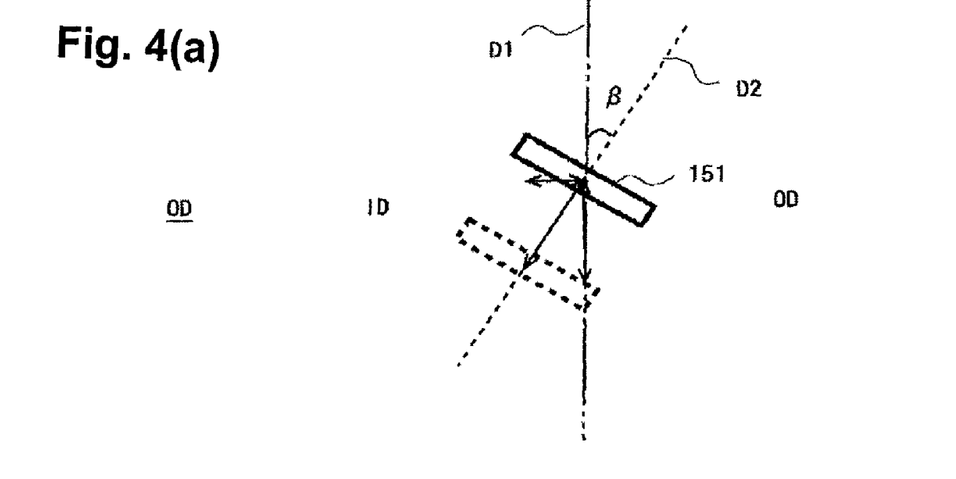
FIGS. 4(a)-4(c) schematically show the relationship between a skew angle and a head vibration according to one embodiment.
Figure 4B:
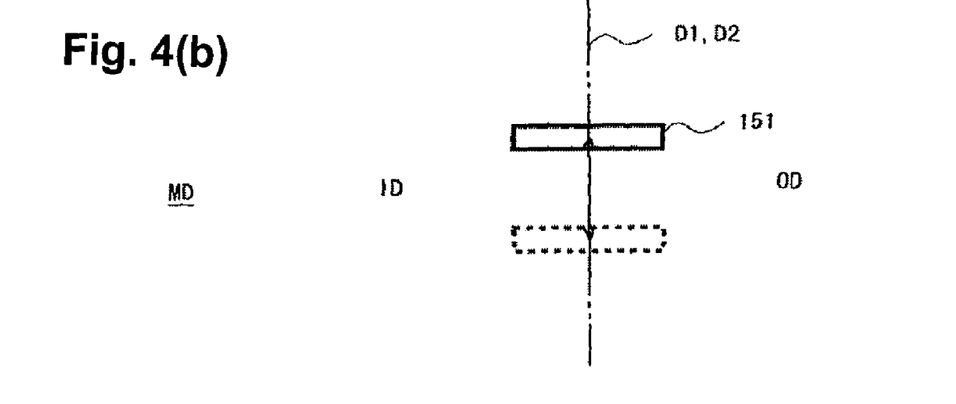
Figure 4C:
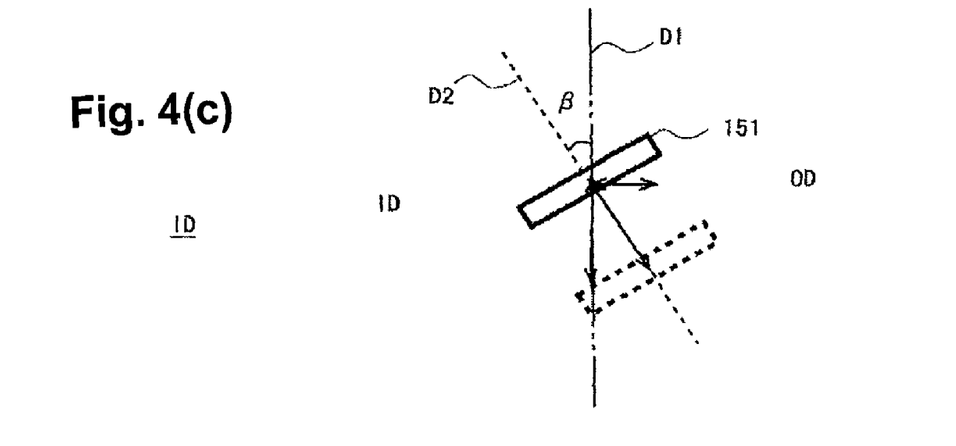

FIGS. 4(a), 4(b), and 4(c) schematically show relationship between the skew angle and the head vibration at an outside periphery (OD), a middle periphery (MD), and an inside periphery (ID), respectively. The drawings provide views of the recording surface viewed from the head slider. The top of the drawing corresponds to the tip of the actuator 106. The skew angle is formed between: a direction regulated between the head element and the turning shaft center; and a tangential direction at the head position over the track.

FIGS. 4(a) through 4(c) show a read element 151 as an example. The position depicted by a solid line corresponds to amplitude 0 of the torsional vibration. The position depicted by a dotted line corresponds to a state of causing the maximum amplitude of the torsional vibration. D1 depicts the track's tangential direction. D2 depicts a direction connecting the turning shaft center with the read element 151. Angle β between the directions D1 and D2 is equivalent to the skew angle.

When the carriage arm 111 generates no twist as described with reference to FIG. 2, the vibration direction of the head slider 105, i.e., that of the read element 151 corresponds to the direction D2. In the examples of FIG. 4, the skew angle becomes 0 at a specified position in the middle periphery as shown in FIG. 4(b).

The HDD 1 is typically designed so as to provide a position that provides skew angle 0 at the middle of the recording surface. This aims at decreasing a maximum absolute value of the skew angle on the recording surface. Skew angle orientations (positive and negative) vary with the outside and inside peripheries across the position corresponding to skew angle 0. Specifically, the direction D2 against the tangential direction D1 varies counterclockwise from the outside periphery to the inside periphery.

The tangential direction D1 matches the vibration direction D2 of the read element 151 at the radial position corresponding to skew angle 0 as shown in FIG. 4(b). That is, the read element 151 vibrates only in the tangential direction (periphery direction) and contains no vibrational component in the radial direction. The read element 151, when vibrated, maintains the on-track state. When the read element 151 vibrates at an outside periphery region as shown in FIG. 4(a), however, the vibration contains not only a vibrational component in the tangential direction D1, but also a vibrational component toward the inside periphery in the radial direction perpendicular to the tangential direction D1. An off-track component is generated toward the inside periphery so that a cosine component of the vibration is parallel to the track and a sine component thereof is perpendicular to the track.

By contrast, the vibration of the read element 151 contains a vibrational component toward the outside periphery at an inside periphery region as shown in FIG. 4(c). The vibration of the read element 151 contains not only a vibrational component in the tangential direction D1, but also a vibrational component toward the outside periphery in the radial direction perpendicular to the tangential direction D1. An off-track component is generated toward the outside periphery so that a cosine component of the vibration is parallel to the track and a sine component thereof is perpendicular to the track.

Figure 5A:
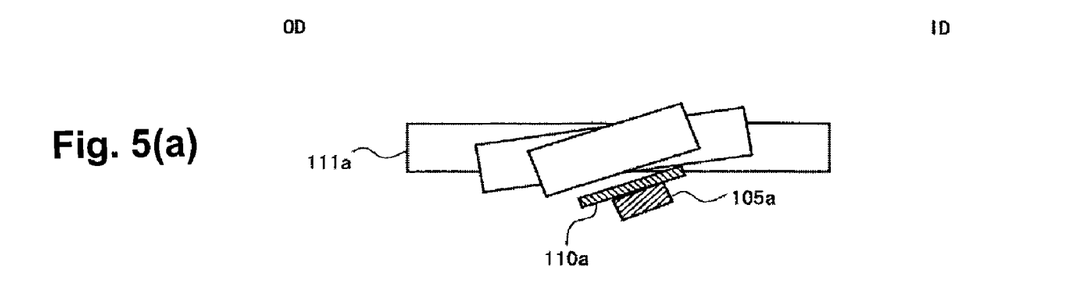
FIGS. 5(a) and 5(b) schematically show the twisted carriage arm, the suspension, and the head slider according to one embodiment viewed from the head slider.
Figure 5B:
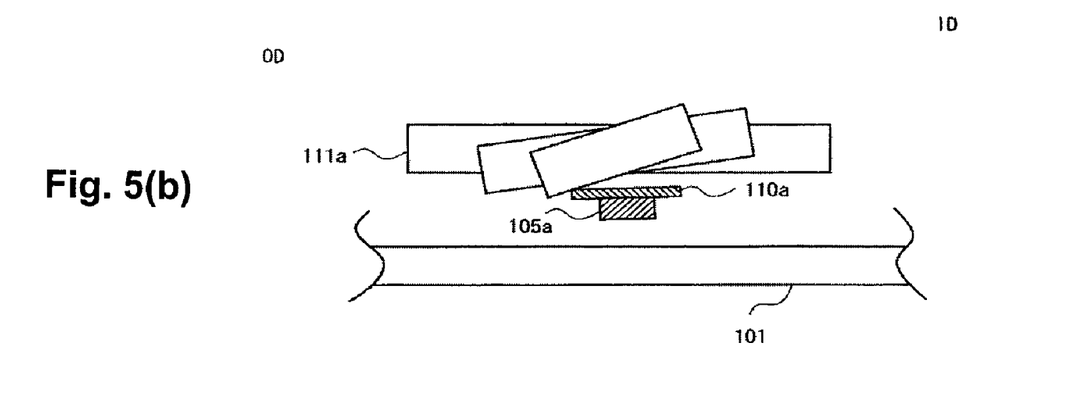

The actuator 106 in FIG. 2 has the twisted carriage arm 111a. Since the carriage arm 111a is twisted, the hinge 361 of the suspension 110a accordingly tilts against the recording surface. The torsional vibration direction tilts against the normal direction of the recording surface. FIGS. 5(a) and 5(b) schematically show the twisted carriage arm 111a, the suspension 110a, and the head slider 105a viewed from the head slider 105a.

FIG. 5(a) shows a state where the actuator 106 is parked on the ramp 115 and the head slider 105a is positioned off the recording surface of the magnetic disk 101. FIG. 5(b) shows a state where the head slider 105a floats over the recording surface of the magnetic disk 101. As shown in FIGS. 5(a) and 5(b), the carriage arm 111a twists so that the twist gradually increases from the turning shaft 107 to the head slider 105a at the tip. The twist tilts toward the outside periphery. That is, the twist tilts so that the surface of the carriage arm 111a opposite the magnetic disk faces toward the inside periphery. When viewed in a cross section along the movable direction, an edge of the suspension 110a (the carriage arm 111a) toward the outside periphery is closer to the recording surface than an edge thereof toward the inside periphery.

In this example, the suspension 110a is flat, not twisted. When the actuator 106 is parked on the ramp 115 as shown in FIG. 5(a), the head slider 105a tilts against the recording surface of the magnetic disk 11 according to the twist of the carriage arm 111a. When the head slider 105a floats over the recording surface as exemplified in FIG. 5(b), the head slider 105a maintains an angle adjusted to the recording surface. As mentioned above, positive and negative pressures exist between the head slider 105a and the recording surface. The ABS of the head slider 105a and the recording surface maintains an angle that is determined in terms of controlling a floating height.

Figure 6A:
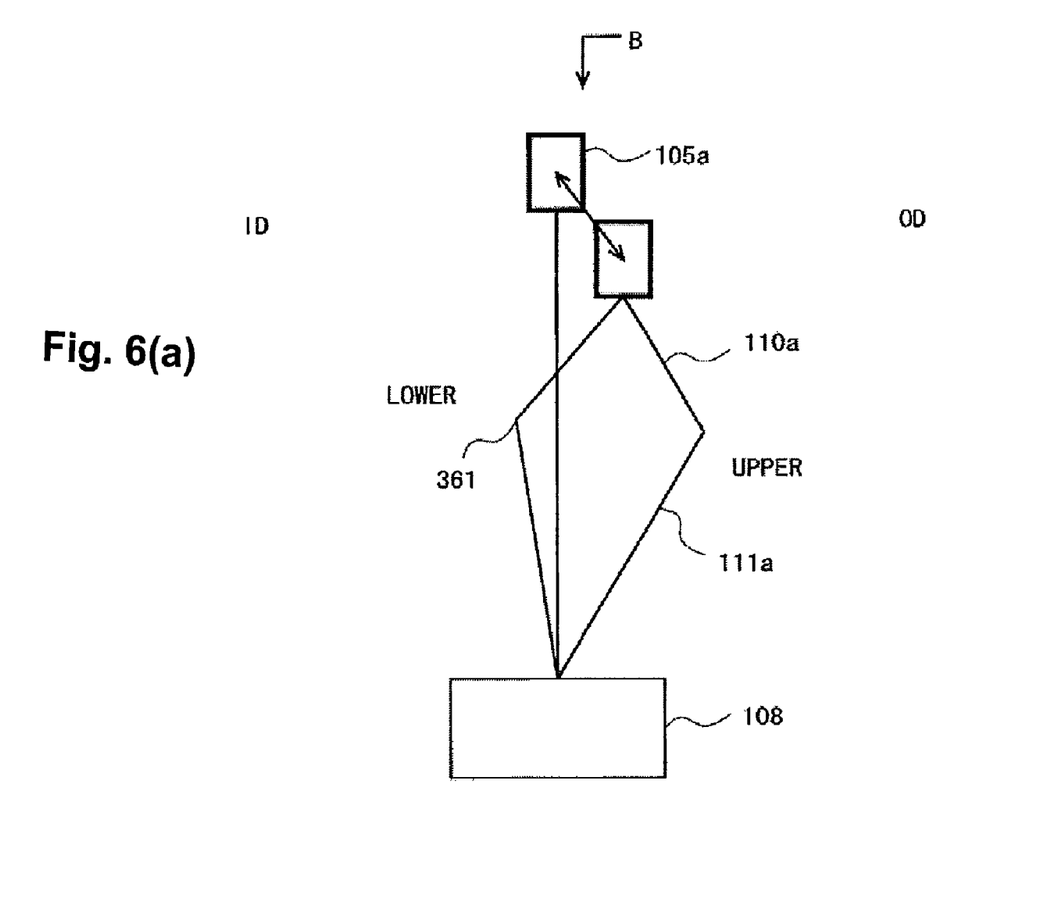
Figure 6B:
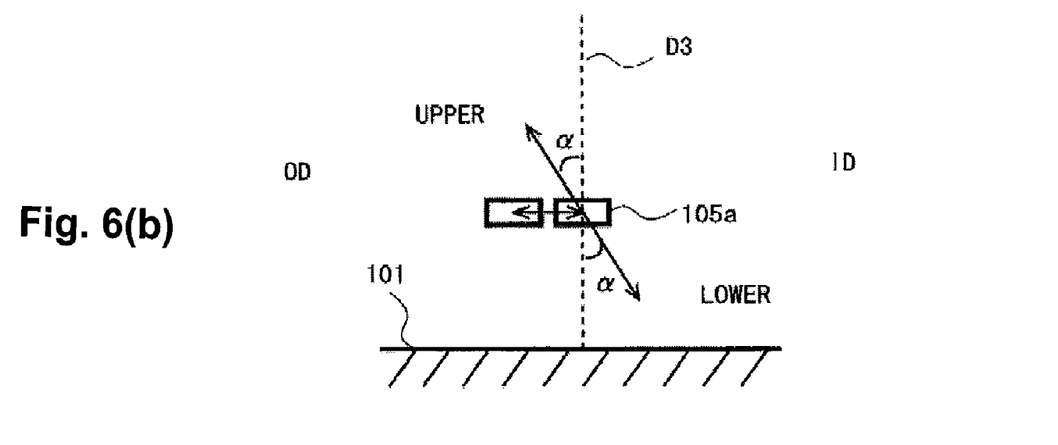

With reference to FIGS. 6(a) and 6(b), the following describes vibration and displacement of the head slider 105a due to torsional vibration of an actuator arm composed of the carriage arm 111a and the suspension 110a. FIG. 6(a) shows torsional vibration of the actuator arm composed of carriage arm 111a and the suspension 110a. When the actuator arm vibrates torsionally, the head slider 105a vibrates so as to move toward the outside periphery.

FIG. 6(a) schematically shows positions of the head slider 105 corresponding to the largest torsion amplitude and the smallest torsion amplitude. The head slider 105 vibrates between the positions shown in the drawing. A torsional direction, i.e., a direction of moving the hinge 361, leaves the recording surface (UPPER) or approaches the recording surface (LOWER). In both cases, the head slider 105a behaves almost similarly. The amplitude may or may not be identical according to the directions of leaving and approaching the recording surface.

The torsional direction tilts against the normal line of the recording surface. FIG. 6(b) shows vibration of the head slider 105 viewed from the tip of the actuator 106 in the track's tangential direction. The torsional direction tilts toward the outside periphery against the normal direction D3 along the direction of leaving the recording surface. By contrast, the torsional direction tilts toward the inside periphery against the normal direction D3 along the direction of approaching the recording surface.

In FIG. 6(b), α denotes a tilt angle of the torsional direction against the normal direction D3 for the recording surface in both directions. Since the twist of the carriage arm 111a moves the surface of the hinge 361 on the head slider side toward the inside periphery of the magnetic disk, the head slider 105a vibrates as shown in FIGS. 6(a) and 6(b). The vibration direction of the head slider 105a contains a component oriented toward the outside periphery in the radial direction of the magnetic disk 101.

As mentioned above with reference to FIG. 4(a), the carriage arm 111a may not be twisted. That is, the torsional direction of the carriage arm 111a and the suspension 110a may match the normal direction for the recording surface. In such case, the head slider 105 vibrates in an outside periphery region so as to move to the inside periphery. On the other hand, the vibration direction of the head slider 105a contains a component oriented toward the outside periphery. Consequently, it is possible to compensate for all or part of the vibration in the off-track direction of the head slider 105a.

There is provided an equal ratio of the vibrational component for the head slider 105a in the radial direction at any radial positions. The vibration of the head slider 105a contains a constant ratio of the track's tangential direction component and the radial direction component independently of radial positions. As shown in FIG. 4(c), the head slider 105a may increase the off-track vibration especially in an inside periphery region. The vibration amplitude may increase in the radial direction at a radial position corresponding to a small off-track component of the vibration in an outside periphery region, also.

It is important to decrease the largest off-track vibration above the recording surface. Decreasing the off-track vibration can improve the head positioning accuracy as a whole. The torsional vibration of the carriage arm 111 and the suspension 110 typically increases toward the outside periphery. This is because a revolution speed of the magnetic disk 101 increases and the torsional vibration due to the wind increases toward the outside periphery. The torsional vibration increases more at the edge of the magnetic disk 101 where strong wind turbulence occurs due to a pressure difference between upper and lower disks.

Therefore, it is preferable to adjust the torsional direction tilt so as to decrease a displacement of the head positioned to an outside periphery region outward from the middle of the recording surface, especially to the outermost track. At a design stage, for example, varying a torsional direction tilt can find a value for decreasing the largest off-track quantity (peak value) above the recording surface. The twist of the carriage arm 111a can be adjusted to that value.

The head position may be most largely displaced when the torsional direction is parallel to the normal direction within the inside periphery. In such case, the twist of the carriage arm 111a may be adjusted to a torsional direction reverse to that mentioned above. Actually, a vibrational component other than the torsional vibration affects the HDD and degrades the head position accuracy. An optimal tilt can be determined by adjusting the torsional direction so as to restrain the head position accuracy from degrading due to these displacements.

Figure 7:
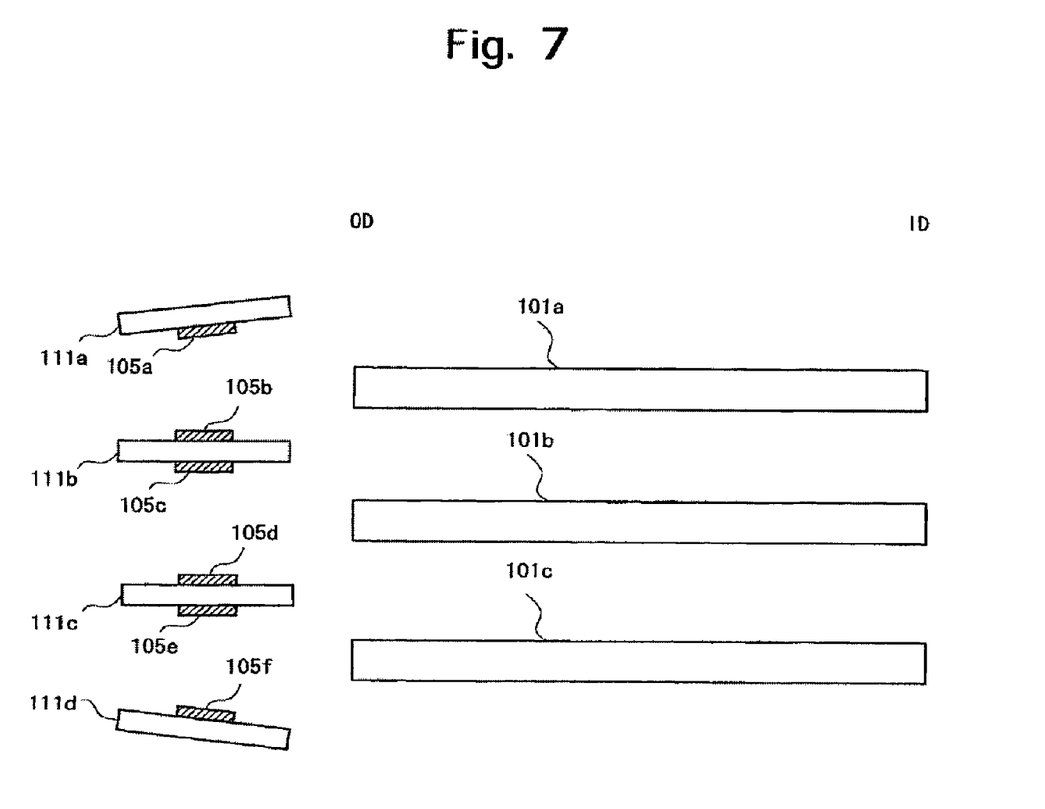
FIG. 7 shows an example of the HDD according to the embodiment having twisted carriage arms at the top and the bottom.

In the example of FIG. 2, only the top carriage arm 111a at the top cover side is twisted. It is preferable to similarly twist the other carriage arms 111 and tilt the torsional directions against the normal direction for the recording surface along the radial direction. FIG. 7 shows an example of twisting the top carriage arm 111a and the bottom carriage arm 111d (at the side of the base 102). Similarly to the carriage arm 111a, the carriage arm 111d is twisted along such a direction that the hinge 361 faces to the inside periphery against the recording surface.

The middle carriage arm 111b is provided with the head sliders 105b and 105c on its both surfaces. The middle carriage arm 111c is provided with the head sliders 105d and 105e on its both surfaces. Twisting the carriage arm 111 cannot produce an effect on both head sliders 105. As shown in FIG. 7, the middle carriage arms 111b and 111c are not twisted and are adjusted so that the torsional directions face to the normal direction for the recording surface. Due to an effect of the wind caused by the disk revolution, the torsional vibration becomes larger on the top carriage arm 111a and the bottom carriage arm 111d at the ends than on the middle carriage arms 111b and 111c. Therefore, it is preferable to apply the measures of the embodiment to both the carriage arms 111a and 111d.

Figure 8:
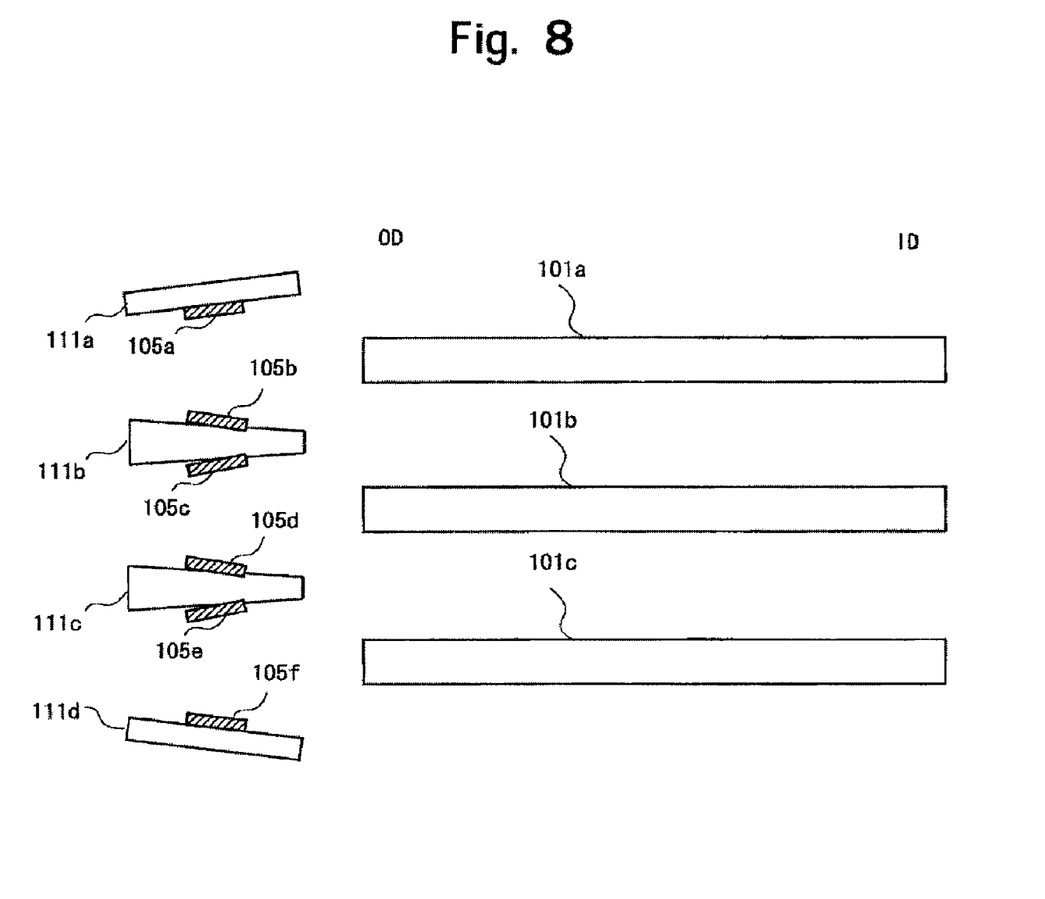
FIG. 8 shows an example of the HDD according to the embodiment having twisted carriage arms and the other carriage arms whose thickness varies along a radial direction.

Twisting the carriage arm 111 is a preferable method because a simple processing method can be used to adjust the torsional direction of the carriage arm 111 and the suspension 110 as mentioned above. Specifically, a jig is used to twist the horizontal carriage arm 111. The suspension 110 can be then attached to manufacture the above-mentioned actuator-head assembly. Another method may be used to adjust the torsional direction. As shown in FIG. 8, for example, the thickness of the carriage arm 111 can be varied in the radial direction to adjust the rigidity. In this manner, the torsional direction can be adjusted.

In the example of FIG. 8, the middle carriage arms 111b and 111c are gradually thinned from the outside periphery to the inside periphery. The suspension 110 is attached to the carriage arm 111 so that edge of the suspension 110 toward the outside periphery becomes closer to the recording surface. The suspension 110 and the head slider 105 tilts toward the outside periphery against the recording surface. The torsional direction can be adjusted as mentioned above. In this manner, adjusting the thickness of the carriage arm 111 can individually adjust the tilts of the suspensions 110 attached to both surfaces of the carriage arm 111.

Further, adjusting the rigidity of the carriage arm 111 can vary the torsional direction. Specific examples include adjusting a balance hole position or size, the number of balance holes, or attaching a reinforcing member. In this manner, the torsional direction can be adjusted by varying the rigidity according to positions of the carriage arm 111.

Figure 9:
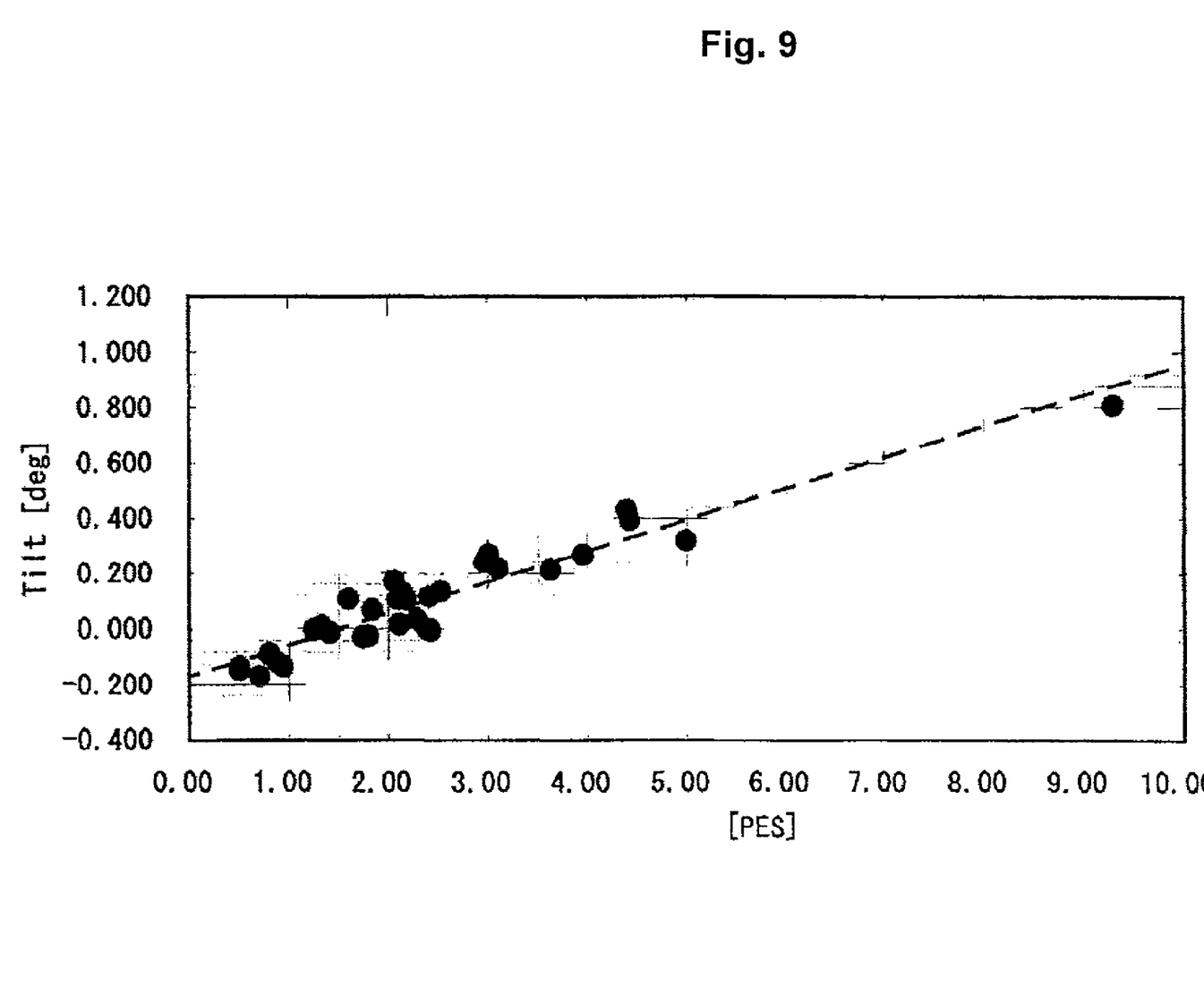
FIG. 9 shows results of measuring relationship between a tilt angle of the hinge and a head position displacement according to one embodiment.

An HDD according to the embodiment as shown in FIG. 7 was manufactured, and the relationship between a tilt angle of the suspension 110, i.e., the hinge 360, and a head position displacement, was measured. FIG. 9 shows the measurement results. The skew angle becomes 0 at a position that divides a data recording region into approximately 3:7 from the innermost periphery to the outermost periphery. In FIG. 9, the Y axis indicates a tilt of the hinge 361 against the recording surface; the X axis indicates a position error signal (PES). The PES is calculated from servo data read from the read element 151 and represents a displacement quantity with reference to a target position. A positive angle indicates a tilt toward the inside periphery, and a negative angle indicates a tilt toward the outside periphery. Therefore, the tilt in FIG. 7 is represented by a negative value. According to the actual measurement values, preferable tilts range between 0.05° and 0.51°. More preferable tilts range between 0.09° and 0.34°. Further, more preferable tilts range between 0.11° and 0.26°.

The graph in FIG. 9 indicates an intercept of −0.17° corresponding to an average line depicted by the broken line. This signifies that a tilt of 0.17° causes the position error (PES) to be 0 at the outermost track on the recording surface. The values in the above-mentioned ranges correspond to one third of and three times of 0.17°, a half of and a double of the same, and one and a half of and one and a half times of the same, respectively. As mentioned above, the outermost periphery causes the largest torsional vibration. When a value for that position is used as a reference and is maintained in the above-mentioned ranges, head vibrations can be suppressed all over the recording surface on average. When the turning shaft receptacle 108 has a bottom (base fixing surface) parallel to the recording surface, for example, the angle can be measured against the surface of the actuator 106 itself.

Since the above-mentioned embodiments adjust the torsional direction according to the actuator shape, the torsional direction is unchanged at any radial positions. On the other hand, the use of an element such as a piezoelectric element can dynamically vary torsional directions according to radial positions. In this case, the piezoelectric element is provided on the recording surface side of the carriage arm 111 or on its reverse side. A signal from the control circuit allows the piezoelectric element to elongate and contract in the turning direction (radial direction), causing the carriage arm 111 to twist. This makes it possible to vary a tilt of the suspension 110, i.e., a tilt in the torsional direction. When the amount of elongating and contracting the piezoelectric element is varied according to tracks, for example, it is possible to reduce off-track components of the vibration for any tracks.

While there have been described specific preferred embodiments of the present invention, it is to be distinctly understood that the present invention is not limited thereto. Those skilled in the art can easily change, add, and replace the elements in the above mentioned embodiments without departing from the spirit and scope of the invention. For example, the invention can be applied to an apparatus that uses the other types of disks. The invention can be also applied to an HDD that is designed to always have the constant orientation of a skew angle.

What is claimed is:

1. A disk drive apparatus comprising:
a motor that rotates a disk for storing data;
a head that accesses a rotating disk; and
a head supporting unit that supports the head and moves the head above a recording surface of the disk,
wherein the head supporting unit has a torsional vibration mode and torsionally vibrates at least at part of positions above the recording surface in a tilting direction along a radial direction of the disk against a normal line for the recording surface so as to reduce a vibrational component of the head along a radial direction of the disk at least.

2. The disk drive apparatus according to claim 1,
wherein the head supporting unit torsionally vibrates at least at part of positions in a region outside a middle of the recording surface in a tilting direction along a radial direction of the disk against a normal line for the recording surface so as to reduce a vibrational component of the head along a radial direction of the disk.

3. The disk drive apparatus according to claim 1,
wherein the head supporting unit turns around a turning shaft;
wherein a skew angle varies toward an outermost track from an innermost track on the recording surface; and
wherein a torsional direction apart from the recording surface tilts toward an outside periphery from the normal line and a torsional direction close to the recording surface tilts toward an inside periphery from the normal line.

4. The disk drive apparatus according to claim 1,
wherein the head supporting unit turns around a turning shaft and twists toward the head from the turning shaft.

5. The disk drive apparatus according to claim 4,
wherein a skew angle varies toward an outermost track from an innermost track on the recording surface; and
wherein the head supporting unit twists so as to tilt toward an outside periphery.

6. The disk drive apparatus according to claim 4,
wherein the head supporting unit includes:
a suspension for supporting the head; and
a carriage arm that connects the suspension with the turning shaft and twists along a direction from the turning shaft to the head.

7. The disk drive apparatus according to claim 1,
wherein an angle of the torsional direction against the normal line ranges between 0.05° and 0.51°.

8. A disk drive apparatus comprising:
a head that accesses a rotating disk; and
a head supporting unit that supports the head, turns around a turning shaft, and moves the head above a recording surface of the disk,
wherein the head supporting unit twists along a direction from the turning shaft to the head and torsionally vibrates in a tilting direction along a radial direction of the disk against a normal line for the recording surface.

9. The disk drive apparatus according to claim 8,
wherein a skew angle varies toward an outermost track from an innermost track on the recording surface; and
wherein the head supporting unit includes:
a suspension for supporting the head; and
a carriage arm that connects the suspension with the turning shaft and twists along a direction from the turning shaft to the head so that the carriage arm tilts toward an outside periphery.

10. The disk drive apparatus according to claim 8,
wherein an angle of the torsional direction against the normal line ranges between 0.05° and 0.51°.

11. A head assembly comprising:
a head that accesses a disk for storing data; and
a head supporting unit that supports the head, turns around a turning shaft, and moves the head above a recording surface of the disk,
wherein the head supporting unit has a torsional vibration mode and torsionally vibrates at least at part of positions above the recording surface in a tilting direction along a radial direction of the disk against a turning shaft direction for the recording surface so as to reduce a vibrational component of the head along a radial direction of the disk at least.

* * * * *